United States Patent
Hatton

(10) Patent No.: US 9,690,387 B2
(45) Date of Patent: Jun. 27, 2017

(54) VEHICLE COMPUTING SYSTEM IN COMMUNICATION WITH A WEARABLE DEVICE

(71) Applicant: FORD GLOBAL TECHNOLOGIES, LLC, Dearborn, MI (US)

(72) Inventor: David Anthony Hatton, Berkley, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 117 days.

(21) Appl. No.: 14/304,327

(22) Filed: Jun. 13, 2014

(65) Prior Publication Data

US 2015/0362997 A1    Dec. 17, 2015

(51) Int. Cl.
| | | |
|---|---|---|
| G06F 7/00 | (2006.01) |
| G06F 17/00 | (2006.01) |
| G06F 19/00 | (2011.01) |
| G06F 3/01 | (2006.01) |
| B60R 16/037 | (2006.01) |
| G06F 1/16 | (2006.01) |
| B60H 1/00 | (2006.01) |

(52) U.S. Cl.
CPC ......... *G06F 3/017* (2013.01); *B60H 1/00657* (2013.01); *B60R 16/037* (2013.01); *G06F 1/163* (2013.01); *G06F 3/014* (2013.01)

(58) Field of Classification Search
CPC ............... G07C 5/008; G07C 9/00309; G07C 2009/00793; B60R 25/24; F02N 11/0807
USPC .............................................................. 701/2
See application file for complete search history.

(56) References Cited

U.S. PATENT DOCUMENTS 8,159,324 B2    4/2012 Zellweger et al.

FOREIGN PATENT DOCUMENTS

| WO | 2013/034556 A1 | 3/2013 |
| WO | 2013/096954 A1 | 6/2013 |
| WO | 2013/188977 A3 | 12/2013 |

OTHER PUBLICATIONS

<https://www.youtube.com/watch?v=Gx3zWHS8amA>"Fin: Wearable Ring Make your palm as Numeric keypad and Gesture Interface", Published Feb. 7, 2014.*
<https://www.youtube.com/watch?v=Xvq6gOKkow8 &feature=youtu.be>"Fin's Gesture Control ICES 2014 Hardware Battlefield", Published Jan. 9, 2014.*
<http://www.slashgear.com/fin-wearable-turns-palm-into-keypad-19317518>FIN Wearable Turns Palm into Keypad, (2014) 8 pages, published Feb. 19, 2014.*
<http://www.slashgear.com/fin-wearable-turns-palm-into-keypad-19317518> FIN Wearable Turns Palm Into Keypad, (2014) 8 pages.

(Continued)

*Primary Examiner* — Maceeh Anwari
(74) *Attorney, Agent, or Firm* — Jennifer M. Stec; Brooks Kushman P.C.

(57) ABSTRACT

A vehicle computing system comprising at least one controller configured to communicate with a wearable device. The at least one controller may be configured to receive data defining a first gesture made using the wearable wireless device. The controller may be further configured to determine a first predefined command, for controlling a vehicle system, previously stored in association with the first gesture. The controller may be further configured to control the vehicle system in accordance with the first predefined command.

9 Claims, 7 Drawing Sheets

(56) References Cited

OTHER PUBLICATIONS

<http://www.youtube.com/watch?v=Gx3zWHS8amA#t=31> Fin: Wearable Ring Make your Palm as Numeric Keypad and Gesuture Interface (2014) 2 pages.
<http://tech.fortune.cnn.com/2014/05/01/kill-the-password-and-the-pin-number-and-the-car-key> Kill the Password. And the Pin Number. And the Car Key (2014) 3 pages.
<http://en-paperblog.com/fin-wearable-ring-invention-from-india-is-going-to-change-the-way-we-live-forever-controls-everythng-841749> Fin—Wearable Ring—Invention from India is Going to Change the Way We Live Forever—Controls Everything (2014) 6 pages.

* cited by examiner

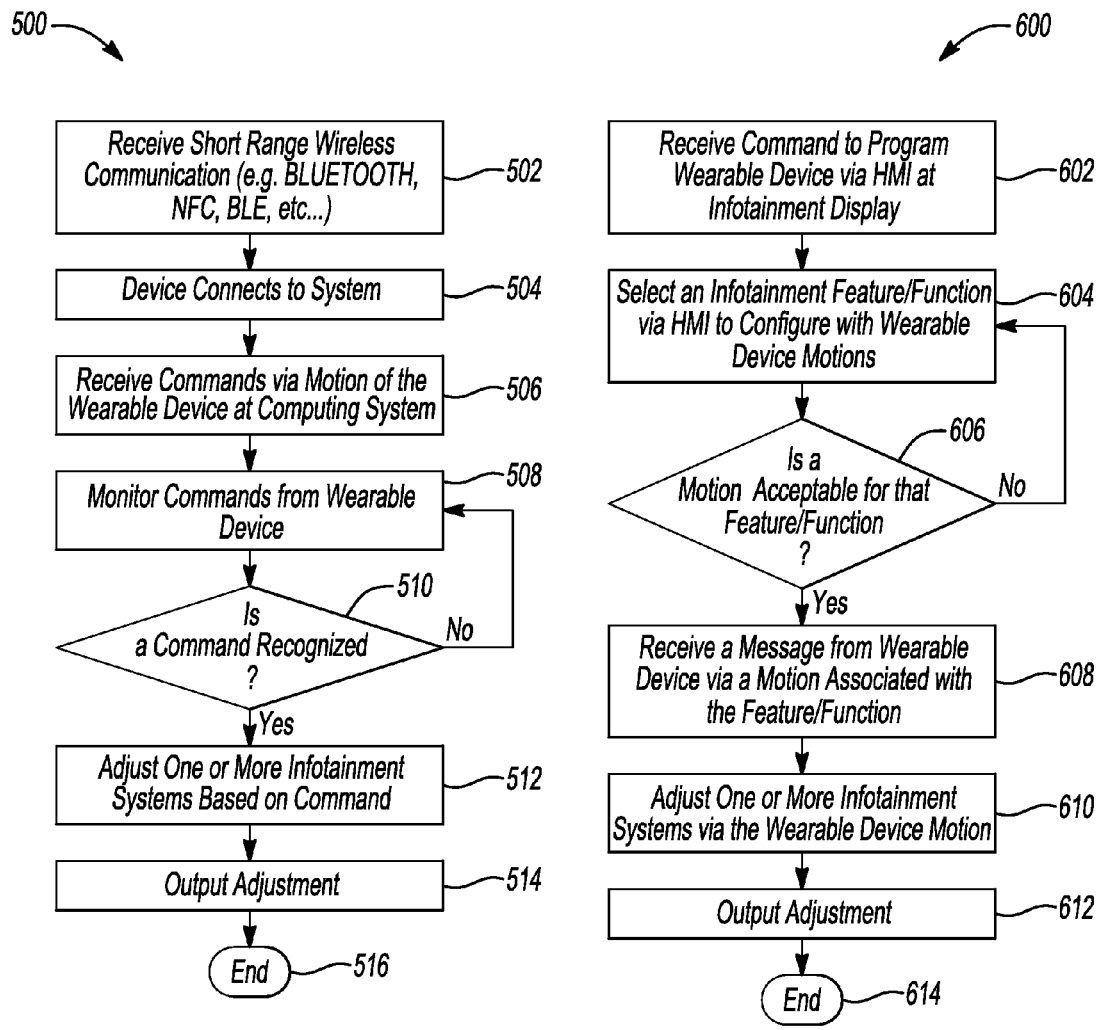

VEHICLE COMPUTING SYSTEM IN COMMUNICATION WITH A WEARABLE DEVICE

TECHNICAL FIELD

The present disclosure generally relates to a portable electronic device for controlling and managing functions and/or data of a vehicle.

BACKGROUND

U.S. Pat. No. 8,159,324 generally discloses a portable electronic device that allows functions and/or data of a vehicle to be controlled and managed. The portable device comprises a means for wirelessly transmitting and receiving signals for short range personalized communication with the vehicle. It further comprises a microprocessor unit for processing functions and/or data of the device and of the vehicle, at least one display screen having a portion which is visible from outside a casing for displaying different menus or data of the device or of the vehicle, and manual control means for controlling the execution of functions of the microprocessor unit. A power source, such as a battery, is provided in the casing for supplying electric power to all the electronic components of the device. The manual control means comprise control keys each having a touch-sensitive pad arranged on an inner face of an upper part of the casing. Each control key may be individually activated by a finger of a user placed on the casing in a specified region of the touch-sensitive pad to be activated. The control means further comprise at least one control button which can be pressed, in particular to make the control keys and the display screen switch from an idle mode to an operating mode.

World Intellectual Property Organization patent application Ser. No. 13/188,977 generally discloses systems, methods, and devices related to a multifunctional digital data storage device which is wearable by the user as a decorative ornament. A wearable device, such as a ring or a wristwatch, is equipped with a transceiver, a storage module, and an antenna. The storage module contains identification data, financial information, and other data which may be used to activate accounts, open digital locks, make payments for transactions at retailers, as well as facilitate other transactions. The device may also be provided with other capabilities such as a heart rate monitor.

World Intellectual Property Organization patent application Ser. No. 13/096,954 generally discloses a wearable master electronic device (Amulet) has a processor with memory, the processor coupled to a body-area network (BAN) radio and uplink radio. The device has firmware for BAN communications with wearable nodes to receive data, and in an embodiment, send configuration data. The device has firmware for using the uplink radio to download apps and configurations, and upload data to a server. An embodiment has accelerometers in Amulet and wearable node, and firmware for using accelerometer readings to determine if node and Amulet are worn by the same subject. Other embodiments use pulse sensors or microphones in the Amulet and node to both identify a subject and verify the Amulet and node are worn by the same subject. Another embodiment uses a bioimpedance sensor to identify the subject. The wearable node may be an insulin pump, chemotherapy pump, TENS unit, cardiac monitor, or other device.

SUMMARY

In at least one embodiment, a vehicle computing system comprises at least one controller in communication with a wearable wireless device. The at least one controller may be configured to receive data defining a first gesture made using the wearable wireless device. The controller may be further configured to determine a first predefined command, for controlling a vehicle system, previously stored in association with the first gesture. The controller may be further configured to control the vehicle system in accordance with the first predefined command.

In another embodiment, a vehicle computing system comprises at least one controller in communication with a wearable device. The controller may be configured to receive a configuration request to configure the wearable device to control a first vehicle function. The controller may be further configured to select the first vehicle function to be controlled and receive data defining a first gesture made using the wearable device. The controller may be further configured to associate the gesture with control of the first vehicle function.

In at least one embodiment, a wearable device comprises at least one controller in communication with a vehicle computing system (VCS). The at least one controller may be configured to receive an instruction from the VCS to associate a first predefined movement to a first vehicle function. The controller may be further configured to detect the first predefined movement based on one or more motion sensors and transmit a command to the VCS to control the first vehicle function.

BRIEF DESCRIPTION OF THE DRAWINGS

FIG. 7 is a flow chart illustrating an example method of the vehicle computing system communicating with the wearable device; and FIG. 8 is a flow chart illustrating an example method to configure one or more infotainment control commands using the wearable device.

DETAILED DESCRIPTION

Figure 1:
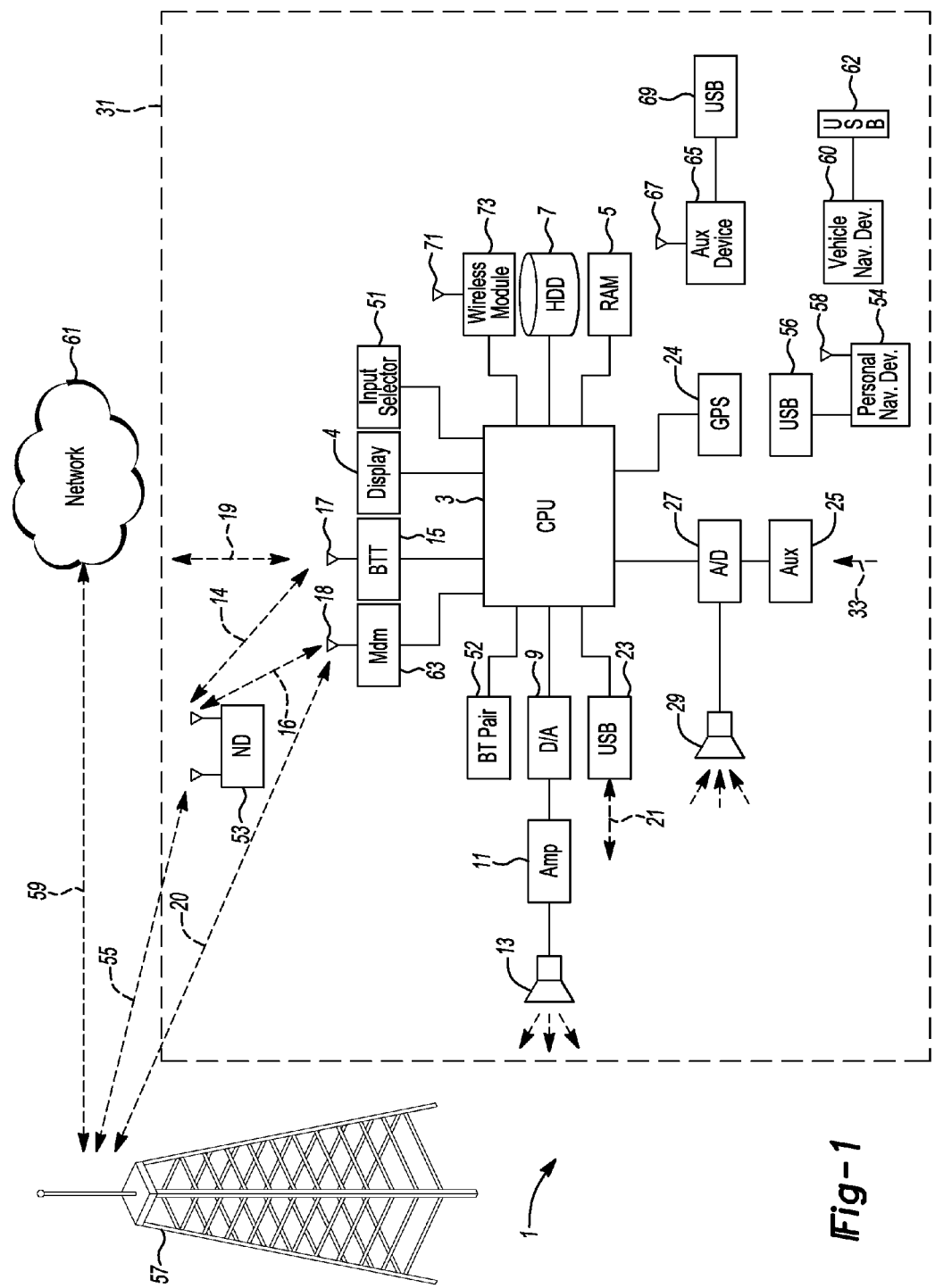
FIG. 1 is a representative block topology of a vehicle infotainment system implementing a user-interactive vehicle information display system according to an embodiment.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The embodiments of the present disclosure generally provide for a plurality of circuits or other electrical devices. All references to the circuits and other electrical devices and the functionality provided by each, are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programmed to perform any number of the functions as disclosed A vehicle computing system may require the use of a key, key fob, and/or a combination thereof to unlock and operate a vehicle. In addition to carrying a key/key fob, an operator may also carry a wallet, pocketbook, briefcase, and/or a mobile device. The number of items the operator has grown accustomed to carrying has increased with the introduction of the mobile device. The mobile device may include, but is not limited to, a smartphone, a tablet, a wearable device, laptop, and/or a combination thereof.

The wearable device may be configured to transmit a short-range wireless broadcast enabling communication with other devices in proximity to the broadcast. The wearable device may wirelessly receive, command, and/or display data to/from a system having the ability to communicate with the short-range wireless broadcast. For example, the wearable device may be configured to perform the functions of a key/key-fob such that the operator may eliminate the need to carry the additional item (i.e., eliminate carrying the key/key-fob). The wearable device may comprise one or more software applications executed on a processor, a transceiver, and other hardware at the device to carry out the functions of a key/key-fob. The wearable device may comprise of various input methods including touch and/or a physical button, and may include a unique graphical interface and/or light emitting diode (LED) indicator. The wearable device may communicate with the vehicle computing system using wireless communication.

The method and system for the wearable device to communicate vehicle functions to the vehicle computing system while eliminating the key-fob may include a vehicle computing system having one or more applications executed on hardware of the system to configure the wearable device to control one or more infotainment functions based on movement(s) of the device. The vehicle computing system may communicate with the wearable device based on one or more wireless technologies. Various embodiments may allow for the vehicle computing system to provide a means of receiving vehicle function commands from the wearable device using wireless technology. Embodiments may also allow for the vehicle computing system to configure the wearable device to control one or more vehicle functions based on movement of the device.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through button presses and/or a spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous vehicle components and auxiliary components in communication with the VCS may use a vehicle network (such as, but not limited to, a CAN bus) to pass data to and from the VCS (or components thereof).

Outputs of the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, wearable device, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a Wi-Fi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include Wi-Fi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., Wi-Fi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a Wi-Fi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

Figure 2:
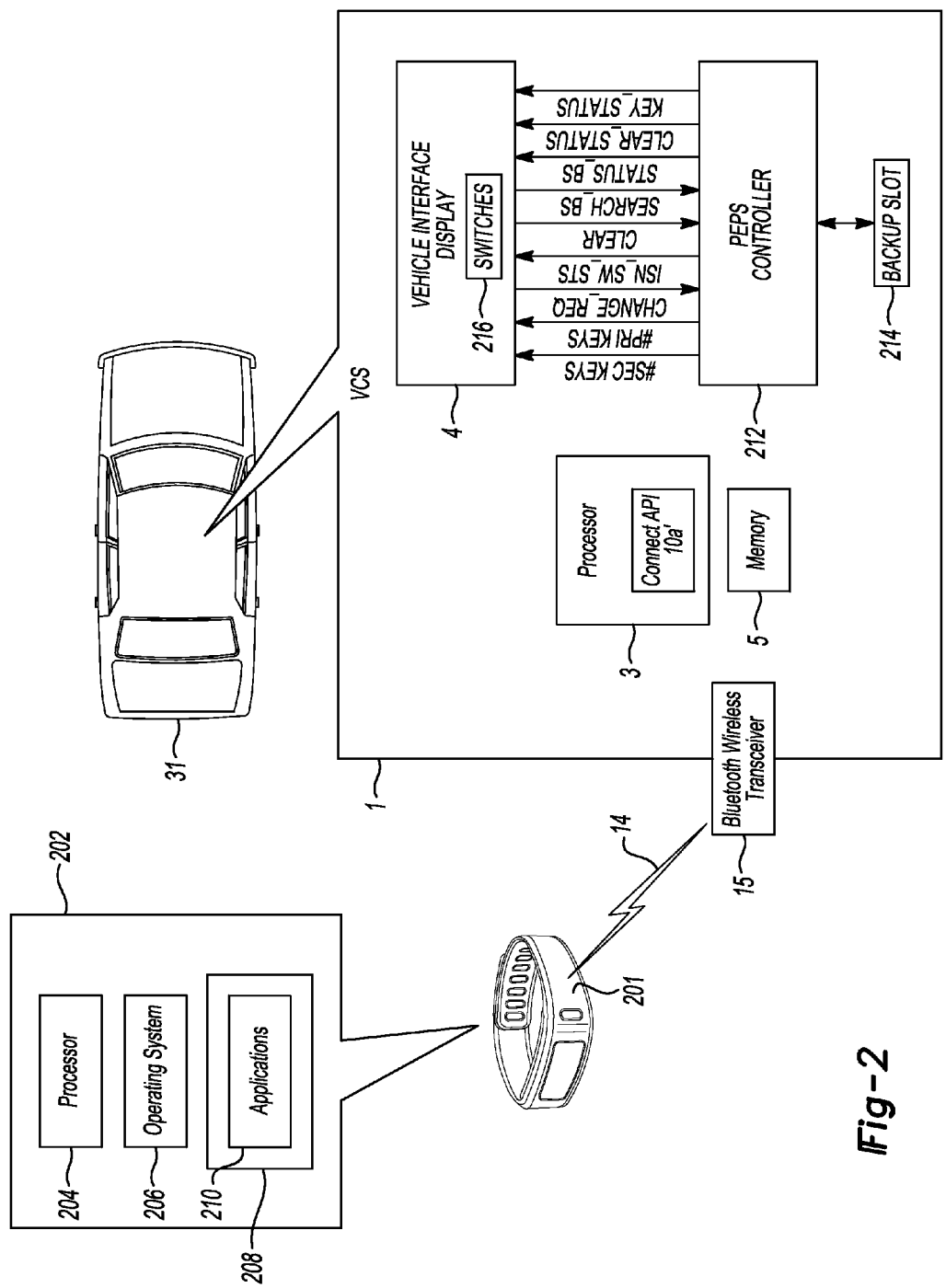
FIG. 2 is a representative block topology of a system for integrating a wearable device with the vehicle based computing system according to an embodiment.

FIG. 2 is an exemplary block topology of a system for integrating a wearable device 201 with the VCS 1 according to an embodiment. The wearable device 201 may include a system 202 comprising at least one processor 204, an operating system 206, a transceiver (not shown), and memory 208 to store one or more applications 210. The wearable device 201 may execute the one or more applications 210 with hardware of the system 202. The wearable device 201 may also include user interface hardware including a display (not shown), motion detectors (not shown), and/or an input mechanism (not shown).

The wearable device 202 may wirelessly communicate one or more control commands to the vehicle 31. The one or more control commands may be based on the movement of the wearable device 201. For example, if the wearable device is moved in a circular motion, the wearable device may transmit a command to the VCS 1 to unlock the door(s) of the vehicle. The vehicle 31 may include the VCS 1 comprising the processor 3, memory 5, the interface system (i.e., touchscreen display 4), the transceiver 15 (e.g., Bluetooth wireless transceiver), a passive entry passive start (PEPS) controller 212, and/or a backup slot 214 for the PEPS 212. The PEPS 212 controller may include, and/or replace, a passive anti-theft security (PATS) controller (not shown).

The PEPS controller 212 may enable the VCS 1 to provide a keyless access and start system using the wearable device 201. To gain access or entry into the vehicle with the wearable device 201, a user may have to wake up the PEPS controller to establish bi-directional communication between the wearable device 201 and the PEPS controller 212. In one example, such a wake up may occur by requiring the user to touch and/or pull the door handle of the vehicle 31. In response to the door handle being toggled or touched, the PEPS controller 212 may wake up and transmit a wireless signal to the wearable device 201. The PEPS controller 212 and the wearable device 201 may undergo a series of communications back and forth to each other (e.g., handshaking) for vehicle access authentication purposes. The PEPS controller 212 may unlock the doors in response to a successful completion of the handshaking process and/or a wearable device maneuvering of a predefined gesture. Once the user is in the vehicle 31, the user may simply perform another maneuver of a predefined gesture of the wearable device to start the vehicle.

In another example, the VCS 1 may implement a low voltage wireless communication protocol that enables the system to continuously look for the wearable device 201. The low voltage wireless communication protocol may establish a bi-directional communication between the wearable device 201 and the PEPS controller 212. The low voltage wireless communication protocol may include, but is not limited to, Bluetooth Low Energy.

The backup slot 214 of the PEPS controller 212 may be used by the VCS 1 to program a particular wearable device 201. For example, the vehicle interface display 4 may prompt the user to place the wearable device 201 on the backup slot 214 to program that particular device so that the user may have two or more wearable devices programed for the vehicle 31. The vehicle interface display 4 may transmit a command signal SEARCH_BS to the PEPS controller 212 to determine whether the user placed the wearable device 201 on the backup slot 214.

The backup slot 214 may be coupled directly to the VCS 1 instead of the PEPS controller 212 with the wearable device 201 that is desired to be programmed as a primary or secondary device placed on the backup slot 214. Other such implementations may utilize the back slot 214 to configure gesture maneuvers of the wearable device 201 to perform one or more vehicle control functions.

The vehicle interface display 4 may be implemented as a message center on an instrument cluster or as a touch screen monitor such that each device is generally configured to present text, menu options, status or other such inquiries to an occupant in a visual format. The occupant may scroll through the various fields of text and select menu options via at least one control switch 216. The control switch 216 may be remotely positioned from the interface display or positioned directly on the interface display. The control switch 216 may include, but is not limited to, a hard button, soft button, touchscreen, voice command, and/or other such external devices (e.g., phones, computers, etc.) that are generally configured to communicate with the VCS 1 of the vehicle 31.

The vehicle interface display 4 may be any such device that is generally situated to provide information and receive feedback to/from a vehicle occupant. The interface display 4, the PEPS controller 212, the processor 3, and the other components in communication with the VCS 1 may communicate with each other via a multiplexed data link communication bus (e.g., CAN Bus).

For example, the VCS 1 may include one or more processors 3 that may comprise body electronic controls of an interior section of the vehicle 31. The one or more processors 3 may include a plurality of fuses, relays, and various micro-controllers for performing any number of functions related to the operation of interior and/or exterior electrically based vehicle features. Such features may include, but are not limited to, electronic unlocking/locking (via interior door lock/unlock switches), remote keyless entry operation, vehicle lighting (interior and/or exterior), electronic power windows, and/or ignition switch status (e.g., Off, Run, Start, Accessory).

The control switch 216 may include one or more switches. The one or more switches may include an ignition switch (not shown) that may be operably coupled to the one or more processors 3. The ignition switch may transmit multiplexed messages on the vehicle network that are indicative of whether the ignition is being requested Off, On, Start, or Accessory.

The VCS 1 may initialize and/or enable hardware components of the system based on a wakeup indicator (not shown). The wakeup indicator may include, but is not limited to, a vehicle start request, a touch or pull of a door handle, a signal received from a seat sensor, and/or a combination thereof. The wakeup indicator may enable one or more transceivers of the VCS 1 to broadcast a signal 14 to search for the wireless device in proximity of the vehicle 31. For example, the VCS 1 may be configured to transmit the signal 14 (e.g., Bluetooth Low Energy, Near Field Communication, etc.) absent the wakeup request in a predefined periodic interval, in a predefined continuous period, and/or a combination thereof. In another example, the VCS 1 may communicate with the wearable device 201 via a wireless connection 14. The VCS may transmit a broadcast signal via the wireless connection 14. For example, once the wearable device connects with the VCS 1 via the wireless connection 14 the VCS 1 may push a notification to wakeup/initialize one or more applications at the wearable device.

The wireless broadcast signal 14 may be generated by the wireless transceiver 15. The wireless broadcast signal 14 may notify the presence of the VCS 1 to the wearable device 201. For example, the wireless transceiver 15 may include, but is not limited to, an iBeacon broadcast. The wireless transceiver generating the iBeacon signal may include, but is not limited to, a low-powered wireless transceiver 15. The iBeacon broadcast generated by the wireless transceiver 15 may send a push notification to the wearable device (i.e., wireless devices) in close proximity of the VCS 1.

The iBeacon may use a Bluetooth Low Energy (BLE) proximity sensing to transmit a universally unique identifier (UUID). The UUID is an identifier standard that may be used to uniquely identify the application on the wearable device associated with the VCS 1.

For example, the wearable device 201 may include an application having the UUID (e.g., a sixty-four hexadecimal character identifier). The VCS 1 may receive a wakeup indicator to begin the iBeacon broadcast comprising the UUID. The iBeacon broadcast may be transmitted to the one or more wearable devices 201 in proximity of the vehicle 31. The iBeacon broadcast may include the UUID associated with the application stored at the wearable device 201.

The wearable device 201 may receive the UUID and perform a lookup in the operating system 206 database. The wearable device 201 may determine if an application 210 matches the UUID. If a match is found, the wearable device 201 may launch the application. The wearable device 201 may launch the application via the iBeacon UUID in several application operating states including, but not limited to, running in the background and/or in a disabled state.

Once the application is launched, the wearable device 201 may transmit data to the VCS 1 to notify the VCS 1 that the application is executed. For example, a vehicle entry application at the wearable device 201 may transmit a message notifying the VCS 1 that the application requests the doors to be unlocked/locked. The wearable device 201 may transmit and receive data to/from the VCS 1 via generic attribute profile protocol (i.e., GATT).

The wearable device 201 may transmit one or more control functions based on at least one of movement of the device, specific input to the device such as a touch or four to six digit passcode input, and/or a combination thereof. The wearable device 201 may include additional security measures applied to the vehicle entry application to ensure the approved occupant is entering the vehicle. The security measures may include certain gestures, movements, and/or motions of the wearable device 201 before transmitting a signal to lock/unlock the vehicle. The VCS 1 may transmit a message via the wireless signal 14 to the wearable device 201 if the security data corresponds to at least one of a manufacturer code, a corresponding key serial number, and/or an encrypted dataset.

The wearable device 201 may include a transceiver (e.g., transponder) for communicating with the vehicle 31. The wearable device 201 processor 205 comprises one or more integrated circuits. The processor in communication with the transceiver is adapted to transmit a signal KEY_ID in the form of a wireless communication signal 14 to the PEPS 212 controller via the Bluetooth wireless transceiver 15. The KEY_ID may generally comprise data that corresponds to the manufacturer code, the corresponding key serial number and encrypted data. The key serial number and the encrypted data may be used to authorize the engine controller to start the vehicle in the event the encrypted data corresponds to predetermined encrypted data stored in a look up table of the PEPS controller 212. The PEPS controller 212 may use the key number and/or the encrypted data transmitted on the signal KEY_ID to determine if the wearable device 201 is associated with a primary driver or secondary driver.

The VCS 1 may enable a start condition based on the PEPS controller 212 decoding the key serial number, the manufacturing code, and corresponding encrypted data received on the signal KEY_ID via the wearable device 201. The VCS 1 compares such data to the key serial number and the encrypted data in the look up table to determine whether such data match prior to starting the vehicle for anti-theft purposes. In the event the data matches, the VCS 1 may include an engine controller operably coupled to the PEPS controller 212 allowing the vehicle to start the engine.

For example, the wearable device 201 may transmit a message to the VCS 1 to unlock the doors. The VCS 1 may not allow the vehicle 31 to start unless the wearable device 201 transmits an additional message that is based on a certain motion of the wearable device 201. Once an occupant wearing the wearable device 201 performs the maneuver, the message may be transmitted to the VCS 1 to enable the vehicle to start.

The VCS 1 may determine a driver status based on the at least one of the key number and encrypted data received from the wearable device 201. The PEP controller 212 may receive the key number and/or the encrypted data via the wearable device 201, and determine whether the occupant is the primary driver or secondary driver. The PEPS controller 212 may transmit a signal KEY_STATUS to the vehicle interface display 4 to indicate whether the occupant is a primary or secondary driver. The PEPS controller 212 and/or vehicle interface display 4 may transmit the signal KEY_STATUS to any controller or module in the VCS 1 such that the functionality or operation performed by a particular controller (or module) may be selectively controlled based on the primary or secondary status.

For example, the vehicle 31 may be a shared vehicle (e.g., rental vehicle, family vehicle, etc.) having an owner (or representative of the owner) as the primary driver and one or more additional users (i.e., renter, children, relative, friend, etc.) as the secondary driver. The VCS 1 may receive a secondary status from the wearable device 201 indicating that the driver is a secondary driver. The primary and secondary driver may have an assigned wearable device or use the same wearable device. If the primary and secondary drivers use the same wearable device, the VCS 1 may determine whether the primary or secondary driver is requesting entry/drive-away of the vehicle 31 based on a movement/gesture of the wearable device. For example, the secondary driver may perform a different gesture using the wearable device to transmit a message to the VCS 1 indicating that the user is the secondary driver while requesting access to the vehicle.

The VCS 1 may enable one or more predefined functional limitations of the vehicle system if a secondary driver is detected. The one or more predefined functional limitations may include, but are not limited to, vehicle travel notification, volume control of the infotainment system, and/or speed limiting calibrations. For example, a seat belt minder, fuel level indicator, reverse parking, object detection, and/or traction control may be calibrated to ensure functionality or operation may be selectively controlled based on a primary or secondary driver. In another example, the VCS 1 may enable one or more predefined settings of infotainment controls based on a recognized wearable device including, but not limited to, radio presets, seat settings, and/or climate control settings.

In another example, the VCS 1 may have an embedded cellular modem (not shown) such that the wearable device 201 may be detected by the system using Wi-Fi communication. In this example, the VCS 1 may also transmit the iBeacon to the wearable device 201 to enable communication via one or more applications at the device. Once the application is enabled, the system may begin to exchange security data between the VCS 1 and wearable device 201. The wearable device 201 may begin controlling one or more vehicle control functions using the Wi-Fi communication.

Figure 3A:
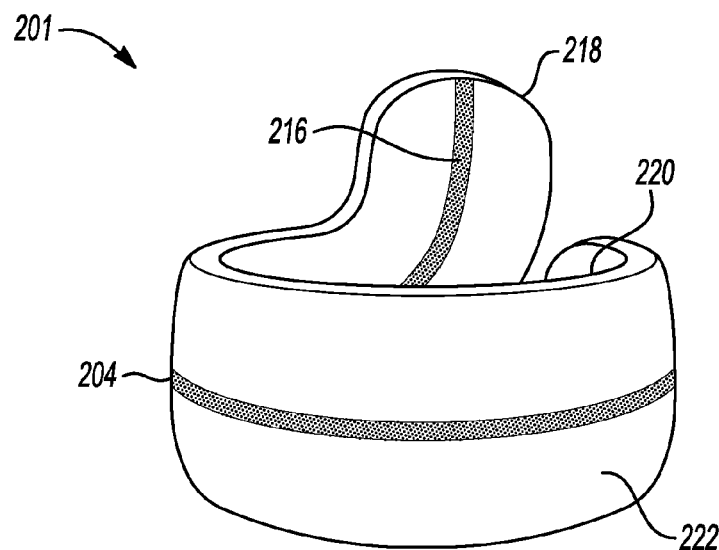
FIGS. 3A-3B illustrate a representative embodiment of the wearable device configured to communicate with the vehicle based computing system.
Figure 3B:
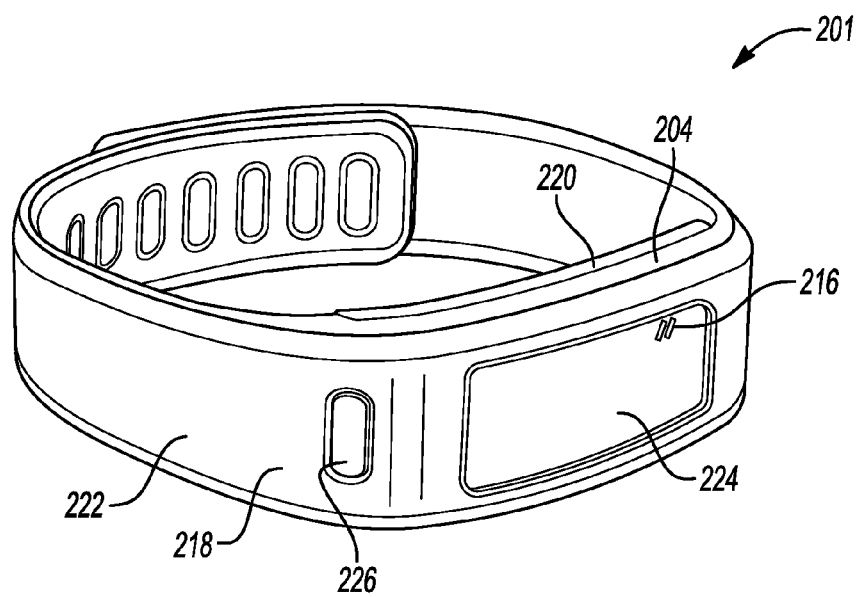

FIGS. 3A-3B illustrate an embodiment of the wearable device 201 configured to communicate with the vehicle based computing system. FIG. 3A is an illustrative embodiment of the wearable device 201 configured as a ring. The ring configuration may include, but is not limited to, a system 202 having a processor 204, an LED indicator 216, a sensor 218, a battery 220, and/or a wireless transceiver 222 (i.e., Bluetooth). The ring wearable device may allow the user to control one or more vehicle functions based on the movement of the device. The ring wearable device may transmit one or more messages based on the predefined movement to the VCS 1 via the wireless transceiver 222.

FIG. 3B illustrates an embodiment of the wearable device 201 configured as a bracelet. The bracelet configuration may include, but is not limited to, a system 202 having a processor 204, an LED indicator 216, a sensor 218, a battery 220, a wireless transceiver 222, a display 224, and/or a switch 226. The bracelet wearable device may allow the user to control one or more vehicle functions based at least on predefined movements, the display 224, the switch 226, and a combination thereof. For example, the VCS may transmit a wireless signal to the bracelet wearable device notifying the device that the vehicle is present. The display 224 of the bracelet may ask if the user would like to unlock the door by using the switch 226 to initiate the transmission of the unlock request. If the user selects to unlock the vehicle, the user may either select the unlock command using the switch 226 and/or performing a particular defined gesture of the bracelet (attached to the user's arm) to unlock the door.

Figure 4:
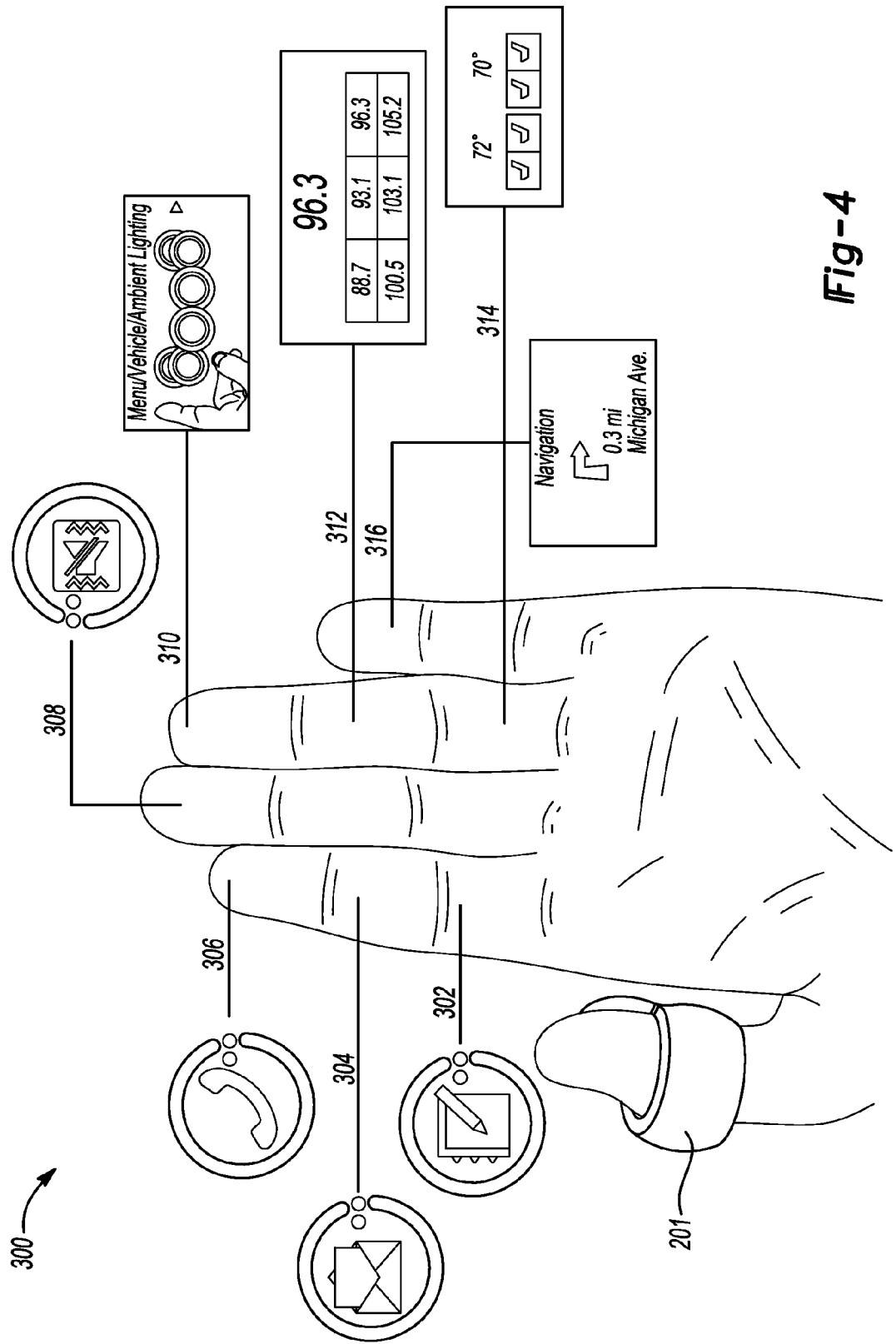
FIG. 4 is an illustrative embodiment of the wearable device controlling one or more infotainment features of a vehicle.

FIG. 4 illustrates an embodiment of the wearable device 201 controlling one or more infotainment features of a vehicle via defined hotkey maneuvers 300. The hotkey maneuvers 300 may be configured based on one or more locations of a palm of the user's hand. The wearable device 201 is able to recognize the segments of the user's fingers, such as the middle portion of the index finger, allowing each portion to be mapped as a hotkey function.

For example, the wearable device 201 may be configured using the backup slot 214 of the VCS to program one or more hotkey maneuvers for controlling vehicle features/functions. In another example, an original equipment manufacturer (OEM) may provide predefined hotkeys to the wearable device 201 to control vehicle features/functions. The hotkey maneuvers may include, but are not limited to, dictating a note 302 (i.e., text message, email message), sending the note 304, answering a phone call 306, muting a vehicle radio 308, adjusting one or more infotainment settings 310, controlling radio inputs 312, adjusting climate controls 314, and/or adjusting navigation controls.

The hotkey maneuvers enable a user to request control and/or adjust one or more infotainment features and functions via the wearable device 201. For example, if the user selects to adjust the climate control 314 by moving the wearable device from a thumb to the lower index of a ring finger. The VCS may recognize that additional movement(s) of the wearable device may select and/or adjust settings of the climate control. The additional movement may include selecting/adjusting temperature, fan speed, and/or heated and cooled seat controls. The additional movement(s) may include tapping and/or swiping to select and adjust settings of the one or more infotainment features.

In another example, the user may have the ring wearable device secured to his/her thumb. The user may approach the vehicle automatically initiating the exchange of security data to enable communication between the wearable device and the VCS. The user having the ring wearable device on his/her thumb may move the thumb to tap at the center of his/her palm to request the doors to unlock. Once the user is in the vehicle, the user may swipe his/her thumb across his/her palm to request the vehicle to start.

Figure 5:
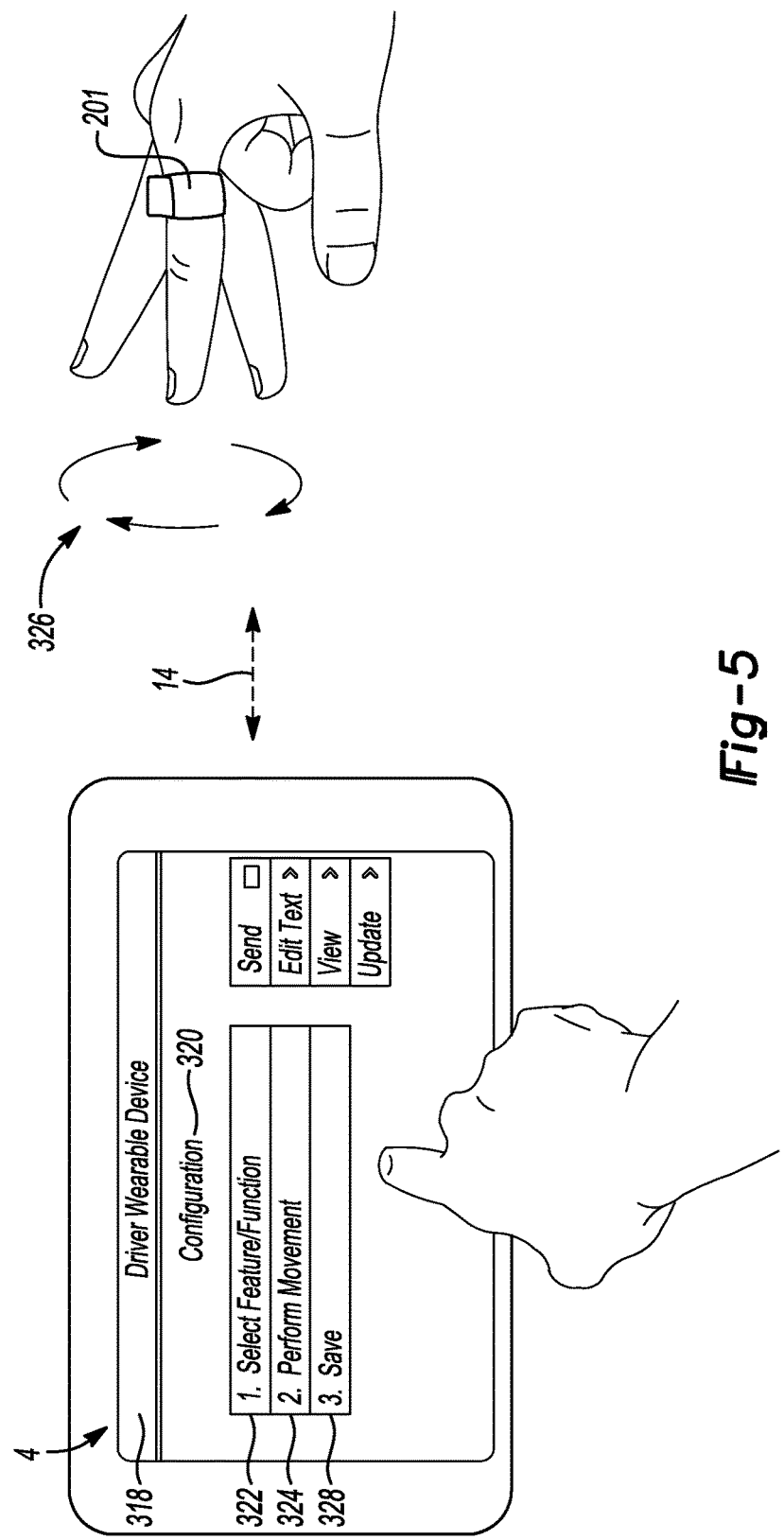
FIG. 5 is an illustrative embodiment of the wearable device in communication with the vehicle based computing system to configure one or more movement commands.

FIG. 5 illustrates an embodiment of the wearable device 201 in communication with the vehicle based computing system to configure one or more movement commands. The configuration of the wearable device 201 may include the VCS 1 comprising the user interactive display screen 4, the backup slot 214, and/or the wireless transceiver (not shown). In one embodiment, the VCS 1 may configure the wearable device 201 by transmitting a control function signal to the wearable device and enabling the wearable device to configure a motion 326 based on the control function signal. In another embodiment, the VCS 1 may require the user to place the wearable device 201 at the backup slot 214 to transmit one or more preconfigured vehicle control settings to the wearable device 201.

For example, the user interaction display screen 4 may enable the occupant (i.e., primary or secondary driver), to configure wearable device 201 via communication with the VCS 1. The occupant may select a driver wearable device tab 318 at the user interaction display screen 4. The driver wearable device tab 318 may include, but is not limited to, synchronization tab (not shown), configuration tab 320, primary/secondary driver settings tab (not shown), and/or a programming tab (not shown). The occupant may select a configuration tab 320 to assign one or more vehicle control settings to a movement pattern 326 of the wearable device 201.

The configuration tab 320 may include, but is not limited to, a select a feature/function tab 322, perform a movement tab 324, and a save configuration tab 328. The feature/function tab 322 may enable the VCS 1 to select a vehicle feature/function for configuration. Once a vehicle feature/function is selected, the occupant may select the perform movement tab 324 which enables the VCS 1 to transmit a request to the wearable device via the wireless communication 14 to perform a movement in relation to the selected vehicle feature/function. For example, the VCS 1 may transmit a vehicle control function to the wearable device 201, and the wearable device 201 may associate that function with a maneuver/gesture 326. The wearable device 201 may transmit a message to the VCS 1 notifying the VCS 1 that the vehicle control function was received and that the wearable device 201 associated a movement with that function. The occupant may then select the save tab 328 which enables the VCS 1 to transmit a message to the wearable device that the configuration is complete for the selected vehicle control feature/function.

Figure 6:
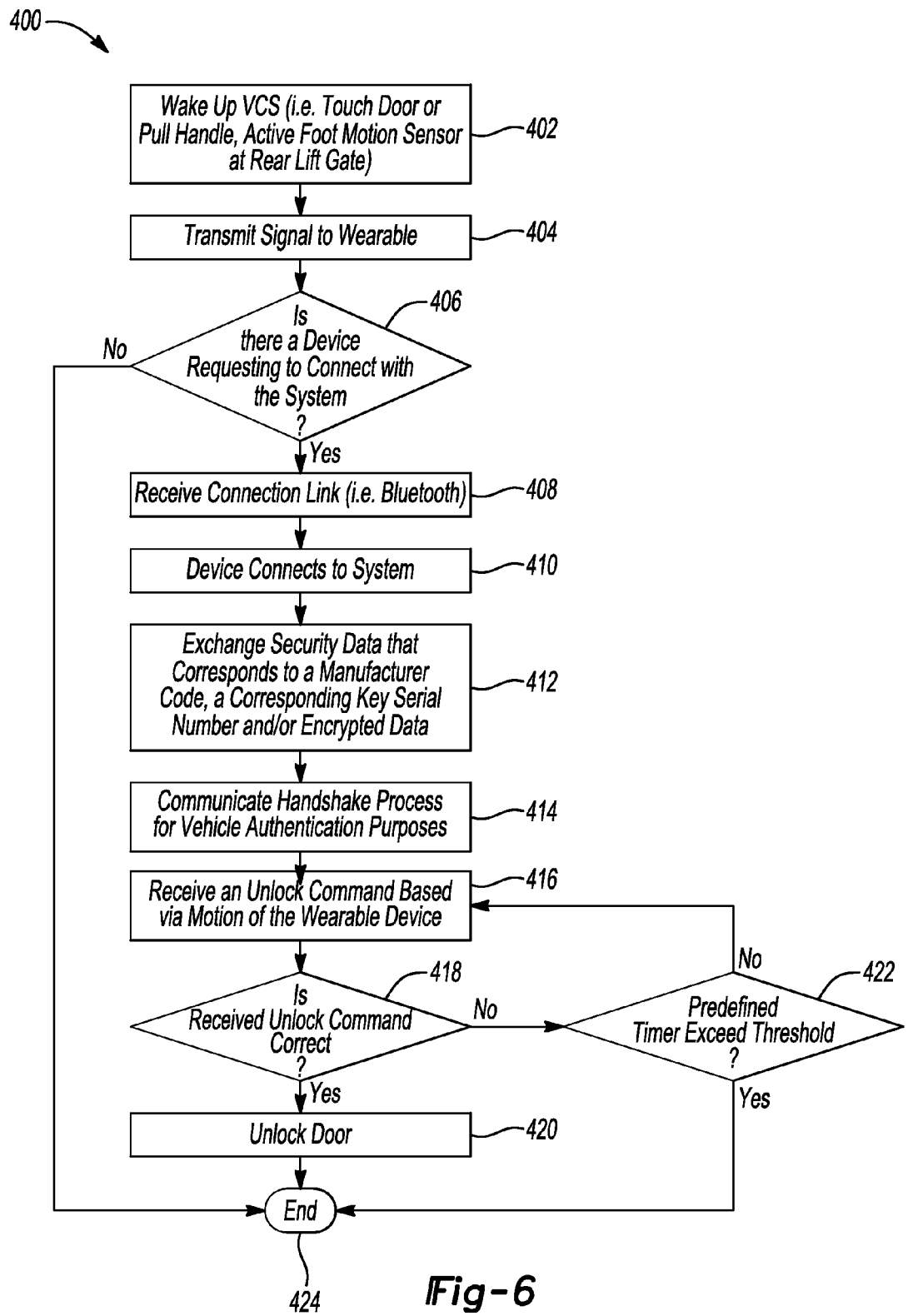
FIG. 6 is a flow chart illustrating an example method of the vehicle computing system communicating with the wearable device.

FIG. 6 is a flow chart illustrating an example method 400 of the VCS in communication with one or more applications at the wearable device. The one or more applications at the wearable device are executed on hardware at the device. The one or more applications may include instructions to control one or more vehicle features/functions. The method 400 may be implemented using software code contained within the VCS. In other embodiments, the method 400 may be implemented in other vehicle controllers, or distributed among multiple vehicle controllers.

Referring again to FIG. 6, the vehicle and its components illustrated in FIG. 1, and FIG. 2 are referenced throughout the discussion of the method 400 to facilitate understanding of various aspects of the present disclosure. The method 400 of controlling a vehicle feature/function (e.g., infotainment control) using a wearable device via a communication link with the VCS may be implemented through a computer algorithm, machine executable code, or software instructions programmed into a suitable programmable logic device(s) of the vehicle, such as the vehicle control module, the device control module, another controller in communication with the vehicle computing system, or a combination thereof. Although the various operations shown in the flowchart diagram 400 appear to occur in a chronological sequence, at least some of the operations may occur in a different order, and some operations may be performed concurrently or not at all.

In operation 402, a user may initialize the VCS by triggering a wake up request. The wake up request may include, but is not limited to, touching the door handle, pulling the door handle, and/or activating a motion sensor near the vehicle (i.e., active foot motion sensor at rear lift gate). In another example, the wake up request may be determined by proximity of the wearable device to the BLE vehicle antenna(s). The proximity of the wearable device to the vehicle may be determined by signal strength of the BLE antenna(s) and/or a GPS comparison via an associated detection algorithm calculating the distance between the device and the VCS. The turn-on request enables the VCS to initialize several systems, subsystems, hardware components, and/or software routines. In another embodiment, the VCS may transmit a wireless communication searching for a wearable device in close proximity of the vehicle. The wireless communication may be transmitted continuously and/or intermittently.

In operation 404, the VCS may transmit a signal requesting communication with the wearable device. For example, the VCS may broadcast an iBeacon transmission via BLE. The iBeacon protocol may wake up one or more applications at the wearable device. The iBeacon may transmit an UUID such that a compatible application or operating system may be commanded to trigger action at the wearable device. The wearable device may receive the iBeacon broadcast from the VCS.

In operation 406, the VCS may determine if there is a wearable device requesting to connect with the system. If the VCS detects a request, the system may receive a connection link via a wireless protocol (i.e., Bluetooth) in operation 408. For example, a wearable device may have been previously paired with the VCS, therefore the system may establish a connection link with the device. If the wearable device has not been paired with the VCS, the VCS may request a pairing sequence. If the VCS does not receive a request to connect from the wireless device, the system may return to a standby and/or sleep mode in operation 424.

In operation 410, the wearable device and VCS may be connected via a wireless communication. Once a communication connection is established, the wearable device may exchange security data that corresponds to a manufacturer code, a corresponding key serial number and/or encrypted data with the VCS in operation 412.

In one example, the VCS may implement a security process to ensure that communication with the application at the wearable device is acceptable for use in the vehicle. The VCS 1 may transmit a token to authenticate the wearable device. The token ensures that the wearable device may be acceptable to communicate with the VCS. In another example, a message protocol may be used to encode messages exchanged between the wearable device and the VCS to command and control authorized communication.

In operation 414, the application at the wearable device and the VCS are connected via the wireless communication (e.g. BLE) after passing appropriate security handshakes and protocols. The VCS may receive an unlock command based on a motion of the wearable device in operation 416 and/or proximity to the BLE antenna located in the vehicle. The VCS may receive motion data from the wearable device. The motion data may include predefined hotkeys, a swipe, and/or a predefined gesture/movement.

In operation 418, the VCS may determine if the unlock command received from the wearable device is the correct signal associated with unlocking the doors of the vehicle. If the received command is correct, the VCS may unlock the door in operation 420. If the received command is incorrect, the VCS may transmit a message to the wearable device notifying that the movement may be incorrect. In another example, the VCS may determine to lock the doors based on the system detecting that the wearable device is moving out of range of the vehicle BLE antenna(s).

In operation 422, the VCS may enable a security measure by allowing one or more received commands based on the movement of the wearable device to be received within a predefined timer. The security measure may prevent an unauthorized user from trying to enter the vehicle. The security measure may allow a number of attempts within a predefined time before locking out the system and putting the VCS in a standby/sleep mode in operation 424.

FIG. 7 is a flow chart illustrating an example method 500 of the vehicle computing system communicating with the wearable device. The VCS may receive one or more commands from the wearable device to control/adjust a vehicle feature/function. The wearable device may transmit the one or more commands based on user input. The user input may include, but is not limited to a predefined movement of the wearable device to transmit a particular command.

In operation 502, the VCS may receive short range wireless communication from a wearable device. The short range wireless communication may include, but is not limited to, BLE, Bluetooth, and/or NFC. The wearable device may go through a pairing process and/or pass through a number of security handshakes before communicating with the VCS.

In operation 504, the wearable device may establish a connection to the VCS. The VCS may receive commands via motions of the wearable device in operation 506. The motions of the wearable device may be preconfigured and associated with one or more vehicle functions/features (i.e., infotainment controls).

In operation 508, the VCS may monitor commands received from the wearable device. The VCS may determine if the received command is recognized as a vehicle feature/function in operation 510.

In operation 512, the VCS may adjust one or more infotainment system controls based on the recognized command. The VCS may transmit a message to the wearable device notifying that the system has enabled control of the feature/function. The VCS may receive additional commands to adjust the feature/function generated by the wearable device motions.

In operation 514, the VCS may output the requested adjustment of the features/functions (i.e., infotainment system) based on the messages received from the wearable device. The VCS may discontinue communication with the wearable device based on several factors including, but not limited to, the location of the wearable device and/or the VCS being requested to power-down in operation 516.

FIG. 8 is a flow chart illustrating an example method 600 to configure one or more infotainment control commands using the wearable device. The VCS may configure the one or more infotainment control commands by transmitting a message having data associated with a specific feature of the infotainment system that may be received by the wearable device. The data may be stored at the wearable device and correlated with a particular motion. The particular motion may include, but is not limited to, hotkeys, swipes, taps, and/or a predefined motion.

In operation 602, the VCS may receive a command via a human machine interface display (HMI). The HMI may include, but is not limited to, the user interactive display, an instrument cluster display, and/or a mobile device display. A user may select an infotainment feature/function via the HMI to configure with the wearable device in operation 604.

In operation 606, the VCS may receive a message from the wearable device notifying the VCS that a motion has been assigned by the wearable device associated with the selected infotainment feature/function. The VCS may receive a message from the wearable device via a motion associated with the feature/function in operation 608.

In operation 610, the VCS may adjust one or more infotainment features based on the wearable device motion. The VCS may output the adjustment to the one or more infotainment features in operation 612. The VCS may discontinue communication with the wearable device in operation 614.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

The invention claimed is:

1. A wearable device comprising:
    a controller in communication with a vehicle computing system (VCS), the controller configured to:
    receive an instruction from the VCS to associate a first predefined movement to a first vehicle function;
    wherein the predefined movement is stored in the VCS;
    detect the first predefined movement based on one or more motion sensors; and
    transmit a command to the VCS to control the first vehicle function.

2. The wearable device of claim 1, wherein the one or more motion sensors is at least one of a gyroscope, a compass, and an accelerometer.

3. The wearable device of claim 1, wherein the communication with the VCS is established via a Bluetooth Low Energy wireless connection.

4. The wearable device of claim 1, wherein the first vehicle function is to adjust a temperature setting for a vehicle climate control system.

5. The wearable device of claim 1, wherein the at least one controller is further configured to:
    receive a configuration request from the VCS via one or more vehicle infotainment controls;
    enable a configuration mode based on the configuration request;
    receive a message having control data based on a second vehicle function;
    record movement data via the one or more motion sensors as a second predefined movement; and
    transmit the second predefined movement to the VCS such that it is associated with the second vehicle function.

6. The wearable device of claim 5, wherein the second vehicle function is fan speed for a vehicle climate control system.

7. The wearable device of claim 1, wherein the at least one controller is further configured to transmit a signal to the VCS that determines whether the signal corresponds to one of a primary device or a secondary device.

8. The wearable device of claim 7, wherein the secondary device is configured to activate or deactivate at least one vehicle function.

9. The wearable device of claim 1, wherein the at least one controller is further configured to transmit a command to control the first vehicle function based on proximity of the VCS.

* * * * *